United States Patent
Richter (10) Patent No.: US 7,097,409 B2
(45) Date of Patent: Aug. 29, 2006

(54) LADDER RACK SYSTEM

(75) Inventor: Thomas Scott Richter, Wauseon, OH (US)

(73) Assignee: Adrian Steel Co., Adrian, MI (US)

( * ) Notice: Subject to any disclaimer, the term of this patent is extended or adjusted under 35 U.S.C. 154(b) by 295 days.

(21) Appl. No.: 10/685,772

(22) Filed: Oct. 14, 2003

(65) Prior Publication Data

US 2005/0079036 A1    Apr. 14, 2005

(51) Int. Cl.
*B60P 9/00*    (2006.01)
*E06C 5/00*    (2006.01)

(52) U.S. Cl. ........................ 414/462; 182/127
(58) Field of Classification Search ................ 414/462; 182/127
See application file for complete search history.

(56) References Cited

U.S. PATENT DOCUMENTS

| | | | | |
|---|---|---|---|---|
| 3,013,681 A | * | 12/1961 | Garnett | ........................ 280/4 |
| 3,058,607 A | * | 10/1962 | Kiley | ........................ 414/462 |
| 3,904,094 A | | 9/1975 | Correll | |
| 3,963,136 A | * | 6/1976 | Spanke | ........................ 414/462 |
| 4,170,331 A | | 10/1979 | Faulstich | |
| 4,262,834 A | * | 4/1981 | Nutt | ........................ 224/324 |
| 4,390,117 A | | 6/1983 | Fagan | |
| 4,813,585 A | | 3/1989 | Nutt | |
| 4,826,387 A | | 5/1989 | Audet | |
| 4,923,103 A | * | 5/1990 | Sauber | ........................ 224/546 |
| 5,058,791 A | * | 10/1991 | Henriquez et al. | .......... 224/310 |
| 5,242,094 A | | 9/1993 | Finley | |
| 5,297,912 A | | 3/1994 | Levi | |
| 5,398,778 A | * | 3/1995 | Sexton | ........................ 182/127 |
| 5,850,891 A | * | 12/1998 | Olms et al. | ................. 182/127 |
| 6,092,972 A | * | 7/2000 | Levi | ........................... 414/462 |
| 6,179,543 B1 | * | 1/2001 | Adame et al. | .............. 414/462 |
| 6,257,534 B1 | | 7/2001 | Finley | |
| 6,315,181 B1 | * | 11/2001 | Bradley et al. | ............. 224/310 |
| 6,360,930 B1 | * | 3/2002 | Flickenger | ................... 224/310 |
| 6,427,889 B1 | * | 8/2002 | Levi | ........................... 224/315 |
| 6,764,268 B1 | * | 7/2004 | Levi | ........................... 414/462 |
| 2002/0090285 A1 | | 7/2002 | Levi | |
| 2002/0117523 A1 | | 8/2002 | Ketterhagen | |

FOREIGN PATENT DOCUMENTS

GB    2360751 A  * 10/2001

* cited by examiner

*Primary Examiner*—Eileen D. Lillis
*Assistant Examiner*—Charles N. Greenhut
(74) *Attorney, Agent, or Firm*—Butzel Long (57) ABSTRACT

A ladder rack for supporting a ladder in a stowage position and for moving the ladder between the stowage position and a loading/unloading position at which the ladder can be loaded onto the rack or unloaded from the rack. The ladder rack includes: a frame assembly which is mounted on a support structure such as a vehicle roof; a bed platform having a first end that is pivotally coupled to the frame assembly at a fixed position and a second end that is coupled to the frame assembly for alternative sliding and hinged movement with respect to the frame assembly; and a manually operative sliding mechanism and a manually operative pivoting mechanism for moving the bed platform between the stowage position and the loading/unloading position.

25 Claims, 10 Drawing Sheets

LADDER RACK SYSTEM

TECHNICAL FIELD

The present invention relates to apparatus and methods for loading and unloading ladders onto/from ladder racks mounted on vehicles and other storage positions. More particularly, the present invention is directed to ladder racks that can be moved easily between storage and loading/unloading positions so as to increase ease of ladder loading and unloading for a user.

BACKGROUND ART

Ladders and sometimes other large pieces of equipment are often transported by utility, telephone, and cable TV personnel and by electricians, construction workers, etc. on racks mounted to the roofs of service or work vehicles, including vans, trucks, etc. Loading and unloading of ladders and other equipment from roof-mounted racks requires awkward lifting of heavy, cumbersome ladders, which may result in damage to vehicles or ladders, or strain and injury to persons attempting to load of unload the ladders.

Numerous devices have been developed and used for receiving and securely storing ladders for stationary storage or for transportation. Such devices address a number of considerations that are unique to storing and securing ladders. For example, since most ladders are bulky and long regardless of their weight, it is difficult to store ladders in many locations, particularly upon vehicle roofs. Moreover, the large size and heavy weight of many ladders can make ladder lifting, manipulation, and other movement during storage a difficult and dangerous process. Several ladder racks have been developed to address these problems. However, such ladder racks are typically complex, expensive, and bulky.

Although the storage of ladders in any situation involves some challenge, vehicular applications are particularly problematic. Most conventional vehicle ladder racks require the user to lift the ladder some distance to place the ladder on the rack. This process can be difficult especially when only one person is trying to lift and manipulate a heavy and/or long ladder onto a ladder rack. Some vehicle ladder racks require manipulation of the ladder rack itself after a ladder has been loaded on the rack. Such ladder racks are designed to provide for ladder storage on top of a vehicle or otherwise in a high position on the vehicle. The additional weight of the portion of the ladder rack that has to be manipulated together with the weight of the ladder after a ladder has been loaded thereon increases the total weight that a user of the rack has to manipulate.

A need exists for a ladder rack that can be used in both stationary and vehicular applications, that is easy to use and provides for easy ladder loading/unloading and access, and that can be easily manipulated to move a ladder between ladder storage and loading/unloading positions.

BRIEF SUMMARY OF THE INVENTION

According to various features, characteristics and embodiments of the present invention which will become apparent as the description thereof proceeds, the present invention provides a ladder rack for supporting a ladder in a stowage position and moving the ladder between the stowage position and a loading/unloading position at which the ladder can be loaded onto the rack or unloaded from the rack, the ladder rack including:

a frame assembly which is mounted on a support structure;

a bed platform having a first end that is pivotally coupled to the frame assembly and a second end that is coupled to the frame assembly for alternative sliding and hinged movement with respect to the frame assembly; and a manually operative sliding mechanism and a manually operative pivoting mechanism for moving the bed platform between the stowage position and the loading/unloading position.

The present invention further provides a ladder rack for supporting a ladder in a stowage position and moving the ladder between the stowage position and a loading/unloading position at which the ladder can be loaded onto the rack or unloaded from the rack, the ladder rack including:

a frame assembly which is mounted on a support structure, the frame assembly having first and second ends;

a bed platform having first and second ends;

a pivot bearing coupling the first end of the bed platform to the first end of the frame assembly;

a guide bar assembly coupling the second end of the bed platform to the second end of the frame assembly, the guide bar assembly including a guide bar that projects outward from the second end of the bed platform;

a fixed guide bar assembly fixed to the second end of the frame assembly, the fixed guide bar assembly having a slot for receiving the guide bar therein; and a hinged guide bar assembly pivotally coupled to the second end of the frame assembly, the hinged guide bar assembly having a slot for receiving the guide bar therein, the guide bar being in both of the slots of the fixed guide bar assembly and the hinged guide bar assembly when the ladder rack is in the stowage position, and the guide bar being exclusively in the slot of the hinged guide assembly when the ladder rack is in the loading/unloading position.

The present invention also provides a method of manually unloading a ladder from a stowage position on the top of a vehicle which comprises:

providing a ladder rack which includes a frame assembly and a bed platform;

mounting the frame assembly to the top of a vehicle;

providing a ladder mounted on the bed platform;

manually sliding one end of the bed assembly outward over a side of the vehicle while pivoting another end of the bed assembly about a fixed pivot point then;

manually pivoting the one end of the bed assembly downward alone the side of the vehicle while pivoting the another end of the bed assembly about the fixed pivot point; and removing the ladder from the bed platform.

The present invention further provides a method of manually loading a ladder into a stowage position on the top of a vehicle which comprises:

providing a ladder rack which includes a frame assembly and a bed platform;

mounting the frame assembly to the top of a vehicle;

positioning one end of the bed platform down along a side of the vehicle while maintaining an opposite end of the bed platform about a fixed pivot point above the vehicle;

mounting a ladder onto the bed platform;

manually pivoting the one end of the bed assembly upward from along the side of the vehicle to above the vehicle while pivoting the opposite end of the bed assembly about the fixed pivot point; and then manually sliding the one end of the bed assembly inward over the top of the vehicle while pivoting the another end of the bed assembly about the fixed pivot point.

BRIEF DESCRIPTION OF DRAWINGS

The present invention will be described with reference to the attached drawings which are given as non-limiting examples only, in which.

BEST MODE FOR CARRYING OUT THE INVENTION

The present invention is directed to a ladder rack that provides for easy loading, unloading and storage of a ladder on the rack. The ladder rack preferably has a bed platform configured to support a ladder loaded thereon and move the ladder between a stowage position above the roof of a vehicle and a loading/unloading position along a side of the vehicle.

The bed platform is coupled to the roof of a vehicle via a frame assembly. The frame assembly is attached to the vehicle so as to be secured in a fixed position over the roof of the vehicle. One end of the bed platform is coupled to the frame assembly for pivotal movement about a point of the frame assembly. The opposite end of the bed platform is coupled to the frame assembly by a combined fixed and hinged guide assembly which allows the opposite end of the bed platform to slide outward over the side of the vehicle and then pivot downward along side the side of the vehicle.

A ladder that is placed on the bed platform can moved together with the bed platform between the loading/unloading position to the stowage position by pivoting one end of the bed platform together with the hinged guide assembly and sliding the same end of the bed platform with respect to the fixed guide assembly, with the opposite end of the bed platform pivoting about a fixed point with respect to the frame assembly.

The ladder rack of the present invention can be used in any application or environment, but has particular advantages when used on a vehicle. Accordingly, although the ladder rack according to the present invention is described herebelow in reference to a specific use in conjunction with motor vehicles, it is to be understood that this description is presented as a non-limiting example only, and that the description is not intended to indicate or imply that the present invention is limited to vehicular applications. Moreover, while the ladder rack of the present invention is illustrated and described for use on a van, it is to be understood that the ladder rack can also be used on any other type of vehicle.

Figure 1:
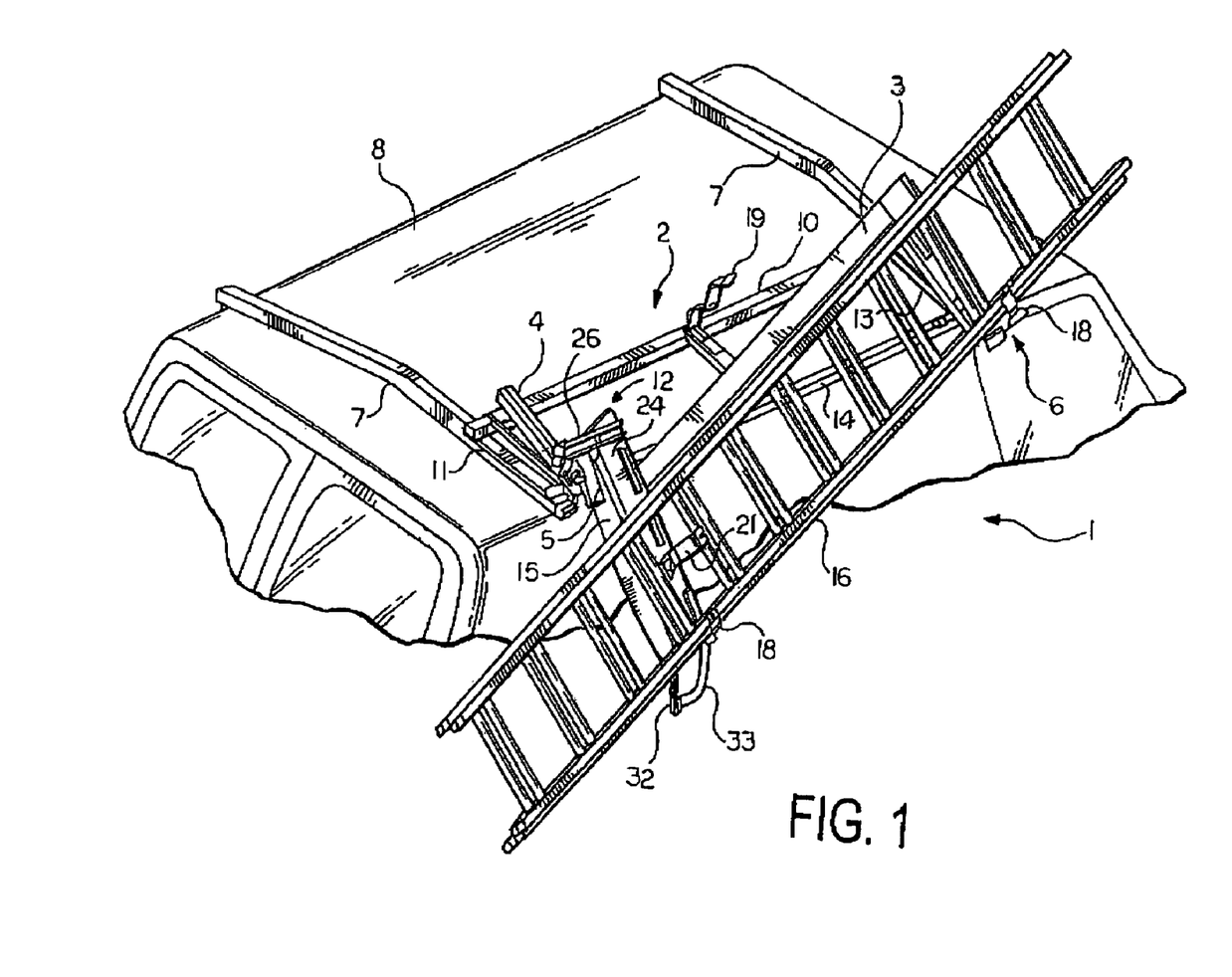
FIG. 1 is a perspective view of a ladder rack according to one embodiment of the present invention, shown mounted upon a vehicle with the ladder rack in a loading/unloading position.

FIG. 1 is a perspective view of a ladder rack according to one embodiment of the present invention, shown mounted upon a vehicle with the ladder rack in a loading/unloading position. The ladder rack of the present invention which is generally identified by reference numeral 1 includes a frame assembly 2, a bed platform 3, a fixed guide assembly 4 and a hinged guide assembly 5. The frame assembly 2 provides a support and mounting structure for the bed platform 3 fixed guide assembly 4 hinged guide assembly 5 and a pivot point 6 about which an end of the bed platform 3 is free to pivot. In the embodiment of the invention shown in FIG. 1, the frame assembly 2 is mounted to a pair of cross bows 7 that extend across the roof of the vehicle 8. The cross bows 7 preferably have a shape that generally conforms to the shape of the roof of a vehicle, are mounted on the roof of the vehicle in a conventional manner, and preferably are located at a distance above the roof of vehicle which provides sufficient clearance for objects that are to be stored on the ladder rack 1. Although two cross bows 7 are suitable for a number of vehicular applications such as the one shown in the figures, any number of cross bows 7 can be mounted upon various portions of any given vehicle. Cross bows 7 and their manner of attachment are well known to those skilled in the art. It is also possibly to mount the frame assembly 2 to vehicles such as trucks, including pick-up trucks and flatbed trucks that do not have roofs that extend beyond the cab of such vehicles. In such applications a post-supported frame assembly can be incorporated. The bed platform 3 has a length which is substantially equal to the length of the frame assembly 2 in FIG. 1, but which could be either longer or shorter that the length of the frame assembly 2 as will be understood as the description of the invention proceeds. Whereas the frame assembly 2 is depicted as having a generally rectangular shape in the figures, the bed platform 3 can include a single inboard side frame portion 10 with an end frame portion 11 beneath guide bar assembly 12 extending from the single inboard side frame portion 10 at one end, and end frame portion 13 extending from the single inboard side frame portion 10 on an opposite end. In other alternative embodiments, the frame assembly 2 could include an outboard side frame 14 (as shown) that would be parallel to the inboard side frame portion and would extend between the end frame portion 11 beneath guide bar assembly 12 and the opposite end frame portion 13.

With the ladder rack in the loading/unloading position depicted in FIG. 1, the guide bar 15 is engaged in and latched to the hinged guide assembly 5 which is pivoted downward over the side of the vehicle 8, so that one end of the bed platform 3 is within easy reach of a person attempting to load/unload a ladder 16 on/from the ladder rack 1. Because the opposite end of the bed platform 3 is coupled to frame assembly 2 by pivot point 6, the position of the bed platform 3 is skewed with respect to the frame assembly 2 in the loading/unloading position depicted in FIG. 1.

Figure 2:
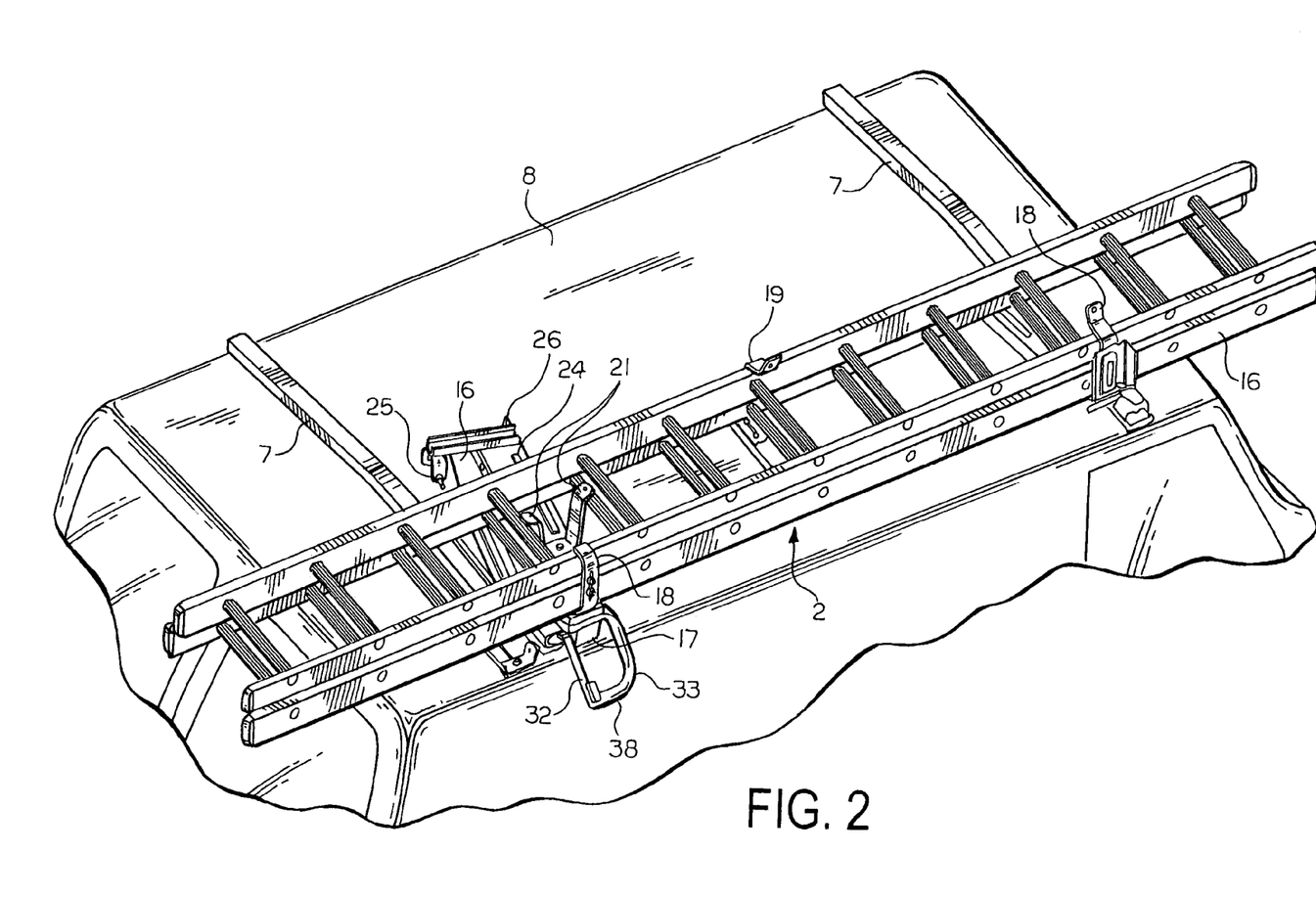
FIG. 2 is a perspective view of the ladder rack of FIG. 1 in a stowage position.

FIG. 2 is a perspective view of the ladder rack of FIG. 1 in a stowage position. In the stowage position, the guide bar 15 is fully engaged in the fixed guide assembly 4 and main latch assembly 17 is engaged to secure the bed platform 3 in substantial alignment with the underlying frame assembly 2. A ladder 16 on the ladder rack 1 is held in position by opposed ladder grips 18, 19 which are provided on an inboard portion of frame assembly 2 and an outboard portion of bed platform 3 as shown. In addition to the ladder grips 18, 19 which secure the ladder 16 from moving sideways, the ladder rack 1 is also provided with a pair of rung grips 21 which secure the ladder 16 from moving along its longitudinal axis. The rung grips 21 are secured to the guide bar 15 and can be configured to engage adjacent rungs of the ladder 16 as depicted. In an alterative embodiment, the rung grips 21 can be configured to engage opposite sides of a common ladder rung. It is to be understood that various configurations of ladder grips and rung grips can be incorporated and used in the ladder rack of the present invention. However, for preferred operation, rung grips should be coupled to the bed platform 3 for movement therewith, and any combination of ladder grips should secure the outboard side of the ladder to the bed platform 3 for movement therewith. Additional means such as cable, cable locks, safety straps, lock hasps, etc. can be used to further secure the ladder to the ladder rack and/or to prevent or discourage theft of a ladder stored on the ladder rack. The ladder grips 18, 19 and/or rung grips 21 can be covered or coated with a polymeric material or a resilient deformable material such as rubber or urethane pieces or foam to increase gripping strength. In addition the cover or coating can be textured, ribbed, dimpled, grooved, curved, or otherwise shaped to prevent slippage.

Figure 3:
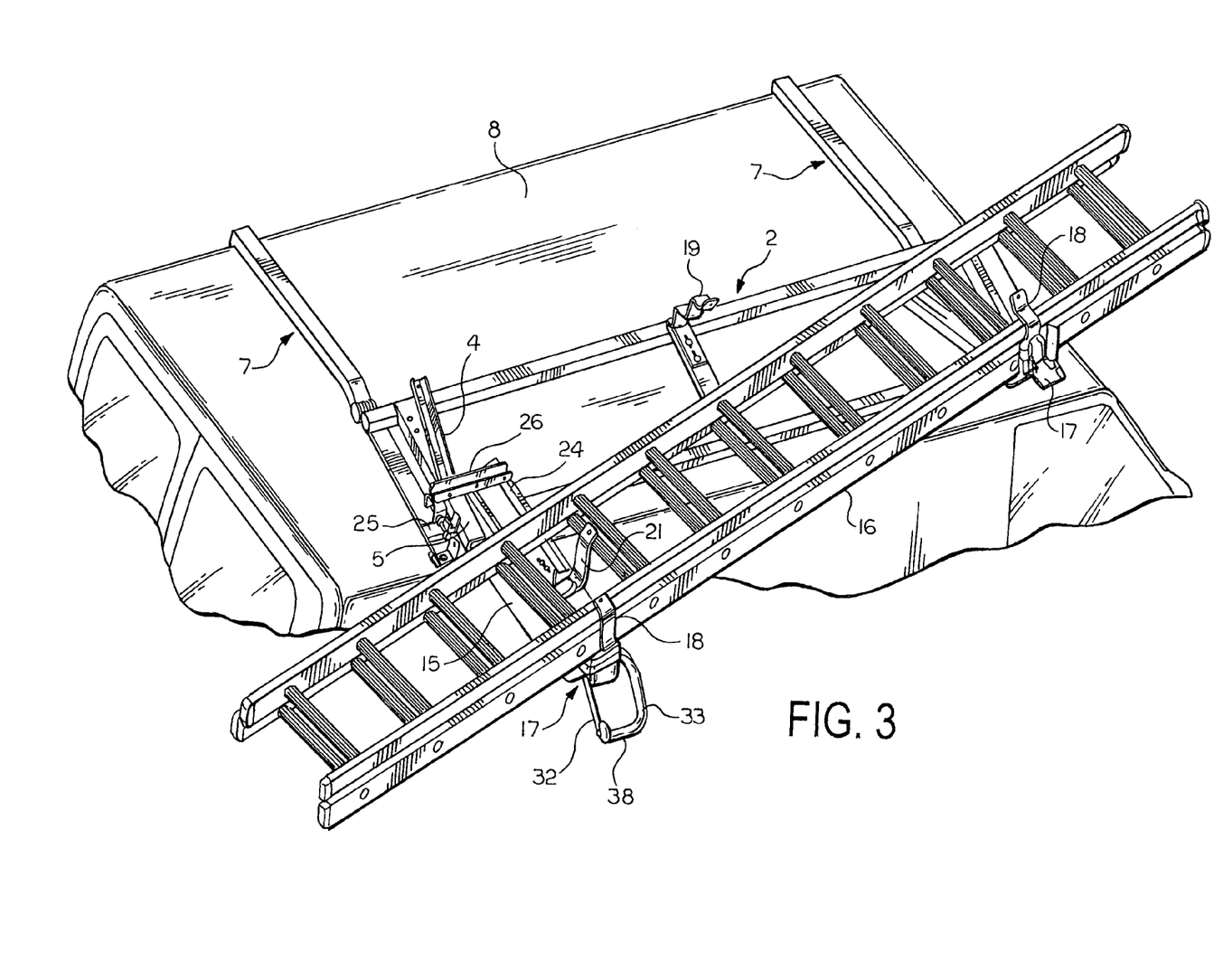
FIG. 3 is a perspective view of the ladder rack of FIG. 1 in an intermediate position between the loading/unloading and stowage positions in which the hinged guide assembly is aligned with the fixed guide assembly.

FIG. 3 is a perspective view of the ladder rack of FIG. 1 in an intermediate position between the loading/unloading and stowage positions in which the hinged guide assembly is aligned with the fixed guide assembly. In the intermediate position shown FIG. 3, the guide bar 15 is fully extended in its engagement with the fixed guide assembly 4 and substantially fully engaged in the hinged guide assembly 5. The bed platform 3 is manually moved from the stowage position shown in FIG. 2 to the intermediate position shown in FIG. 3 by releasing main latch assembly 17 and sliding guide bar 15 outward along fixed guide assembly 4. As the bed platform 3 is slid between the stowage position to the intermediate position depicted in FIG. 3, the bed platform 3 and ladder 16 pivot about pivot point 6 in a plane which is parallel to the frame assembly 2 (which can have a slight crown depending on the shape of the cross bows 7). This planar sliding movement is controlled in part by the cooperation between the fixed guide assembly 4 and the guide bar 15.

In order for the bed platform 3 (with ladder 16 secured thereto) to move from the intermediate position shown in FIG. 3 into the loading/unloading position shown in FIG. 1, the hinged guide assembly 5 and the fixed guide assembly 4 must be disengaged from one another. Moreover, the guide bar 15 must be fully disengaged from the fixed guide assembly 4 and only engaged in the hinged guide assembly 5. Finally, the guide bar assembly 12 will be latched to the hinged guide assembly 5 so that the guide bar 15 and hinged guide assembly 5 can pivot in a hinged manner from the intermediate position depicted in FIG. 3 into the loading/unloading position shown in FIG. 1. The bed platform 3 essentially pivots from the intermediate position depicted in FIG. 3 into the loading/unloading position shown in FIG. 1 about a pivot axis that extends though the hinge axis 22 of the hinged guide assembly 5 and through pivot point 6, as the hinged guide assembly 5 pivots about its hinge axis 22 (see FIG. 6).

In order to assist in controlling movement of the ladder rack 1 between the intermediate position depicted in FIG. 3 and the loading/unloading position shown in FIG. 1 a mechanical and/or hydraulic dampener 23 (see FIG. 10) is provided which is coupled between the bed platform 3 and the frame assembly 2 at or near a corner of the bed platform 3 which is opposite the pivot point 6. The dampener 23 reduces or dampens the weight that an operator would normally have to lift when moving a ladder 16 on the ladder rack 1 from the loading position to the intermediate position, and the weight that an operator would normally have to control when moving a ladder 16 on the ladder rack 1 from the intermediate position to the unloading position.

Figure 4:
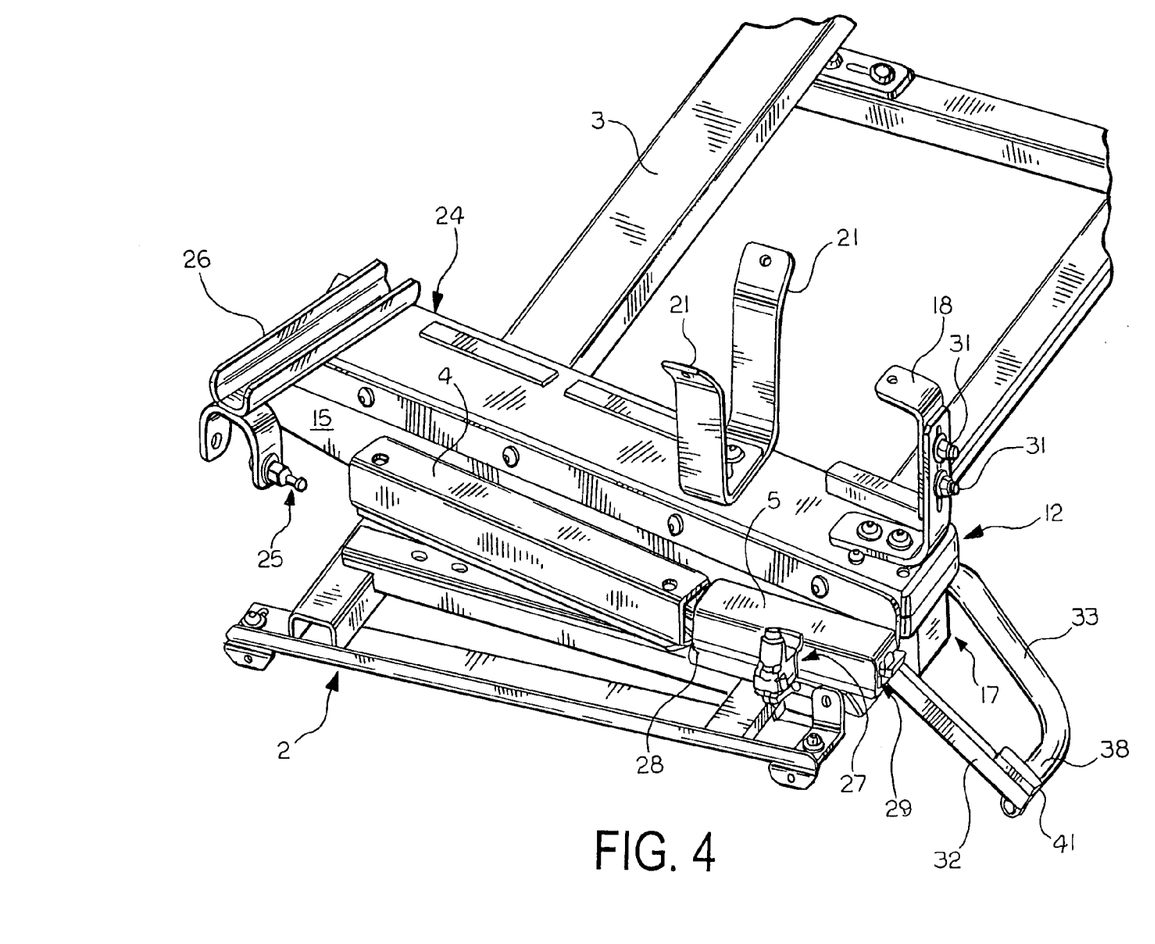
FIG. 4 is a perspective end view of the rear guide assembly according to one embodiment of the present invention with the guide bar fully engaged in the fixed guide assembly.

FIG. 4 is a perspective end view of the rear guide assembly according to one embodiment of the present invention with the guide bar fully engaged in the fixed guide assembly. The guide bar 15 is part of a guide bar assembly that includes a carriage 24 from which a guide bar 15 extends. As depicted, the guide bar 15 can comprise a flange which can be bolted to the carriage 24. Alternative embodiments include the guide bar 15 being secured within a slot provided in the carriage 24 or secured between upper and lower portions of the carriage 24, or any equivalent assembly arrangement including an integral carriage/guide bar. The carriage 24 supports a pin latch 25 on an inboard end by a support arm 26. As discussed in more detail below, the pin latch 24 cooperates with latch stop assembly 27 to unlatch the hinged guide assembly 5 from the frame assembly 2 for pivotal movement with respect thereto.

The guide bar 15 is received in slots 28, 29 which are provided in the fixed guide assembly 4 and hinged guide assembly 5 respectively. (See FIG. 4). The guide bar 15 has a substantially arcuate shape which corresponds substantially to a radius of curvature that extends from pivot point 6 to the leading edge of the guide bar 15. The arcuate shape of the guide bar 15 can be a smooth curve or a series of angular shapes. The fixed guide assembly and the hinged guide assembly 5 are compatibly aligned so that the substantially arcuate shaped guide bar 15 can simultaneously slide though the slots 28 and 29 provided in the fixed guide assembly 4 and hinged guide assembly 5 respectively. FIG. 4 depicts each of the fixed guide assembly 4 and hinged guide assembly 5 as being separately linear and therefore they are angularly aligned with one another. In alternative embodiments, the fixed guide assembly 4 and hinged guide assembly 5 could have curved shapes. In order to reduce friction between the guide bar 15 and the slots 28 and 29 provided in the fixed guide assembly 4 and hinged guide assembly 5 and associated wear, bearing surfaces made from suitable bearing materials such as plastics or polymeric materials or resins including plastics, urethane, nylon, Teflon®, or other low wear material permitting smooth translational movement can be provided within or as slots 28 and 29.

As shown in FIG. 4, the pair of ladder rung grips 21 and an outboard ladder grip 18 are provided on carriage 24 and secured thereto in an adjustable manner by fasteners 31. The particular ladder grip exemplified in FIG. 4 has an adjustable height to accommodate ladders or other pieces of equipment having different heights or shapes.

A latch stop assembly 27 is fixed to the hinged guide assembly 5 and aligned to receive and cooperate with the pin latch 25 so that the guide bar assembly 12 and hinged guide assembly 5 can pivot with respect to the frame assembly 2.

Also shown in FIG. 4 are a main latch release lever 32 and a handle 33 by which an operator can manually manipulate the movement of the ladder rack 1 between the loading/unloading position and the stowage position and any intermediate position. The structure and operation of the main latch assembly with be discussed in detail below.

Figure 5:
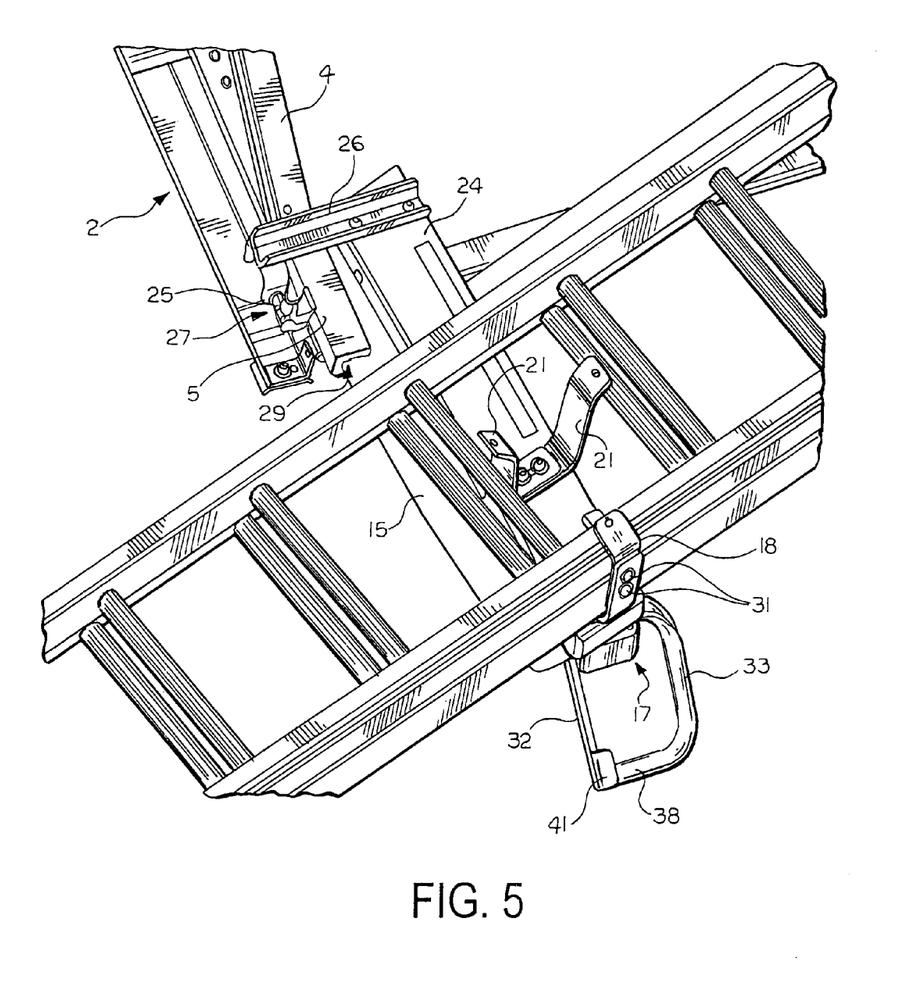
FIG. 5 is a perspective end view of the rear guide assembly of FIG. 4 with the guide bar engaged in and latched to the hinged guide assembly.

FIG. 5 is a perspective end view of the rear guide assembly of FIG. 4 with the guide bar engaged in and latched to the hinged guide assembly. In FIG. 5 the inboard end of the guide bar 15 has cleared slot 28 of the fixed guide assembly 4 and the latch pin 25 has engaged and abutted latch stop assembly 27. The cooperation of the pin latch 25 and the latch stop assembly 27 allows the hinged guide assembly 5 with guide bar 15 engaged therein to pivot downward over the side of a vehicle to which the ladder rack 1 is mounted. In addition to allowing for such pivotal movement, the engagement of the pin latch 25 into latch stop assembly 27 prevents further movement of the guide bar 15 within slot 29 of hinged guide assembly 5 and therefore prevents the guide bar assembly 12 from becoming completely detached from the bed platform 3 and dropping off the side of the vehicle.

Figure 6:
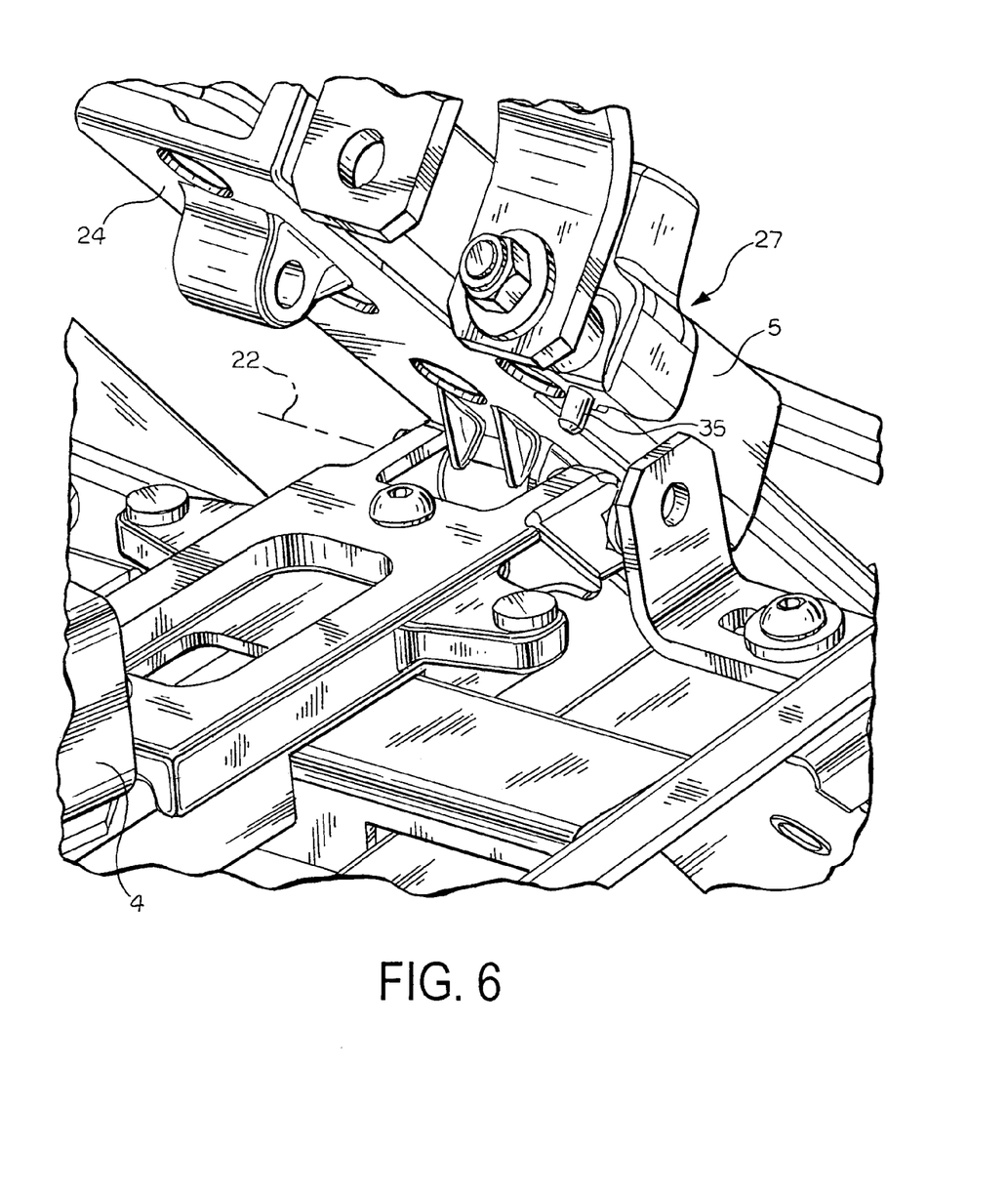
FIG. 6 is a perspective view of the underside of the hinged guide assembly with the guide bar latched thereto.

FIG. 6 is a perspective view of the underside of the hinged guide assembly with the guide bar latched thereto. In FIG. 6 a latch actuator pin 35 is shown as projecting outward from the latch stop assembly 27. The latch actuator pin 35 is spring biased downward as described in more detail below. The latch actuator pin 35 also includes a notched portion 36 (see FIG. 9) through which an enlarged end portion of pin latch 25 can pass when latch actuator pin 35 is pushed upward and the notched portion 36 is aligned with a through-bore 37 (see FIG. 9) provided in latch stop assembly 27. Through-bore 37 is configured and aligned to receive pin latch 25 therein. When the latch actuator pin 35 extends downward though the bottom of the latch stop assembly 27 as depicted in FIG. 6, the notched portion 36 is out of alignment with the enlarged portion of the pin latch 25 and pin latch 25 is therefore effectively latched to the latch stop assembly 27.

From the above description, it can be understood that when the hinged guide assembly 5 is aligned with the fixed guide assembly 4 and down against the underlying structure of the frame assembly 2, the latch actuator pin 35 is pushed upward against the spring biasing force and the notched portion 36 of the latch actuator pin 35 is aligned with the through-bore 37 on latch stop assembly 27. In this configuration, the fixed guide assembly 3 and the hinged guide assembly 5 are aligned so that the guide bar 15 can freely slide through the slots 28 and 29 provided in the fixed guide assembly 4 and the hinged guide assembly 5. When the guide bar 15 reaches its most outboard position, the pin latch 25 enters though-bore 37 and the enlarged end portion of the pin latch 25 passes through notched portion 36 of latch actuator pin 35. At the same time, the inboard end of guide bar 15 clears the slot 28 provided in fixed guide assembly 4. Therefore, guide bar assembly 12 becomes latched to the hinged guide assembly 5 and is pivotal therewith. The guide bar assembly 12 is only released from being latched to the hinged guide assembly 5 when the hinged guide assembly 5 is pivoted back onto the underlying frame assembly 4, and the lower portion of latch actuator pin 35 is pushed upward to realign the notched portion 36 of the latch actuator pin 35 with the through-bore 37 and thereby release pin latch 25.

Figure 7:
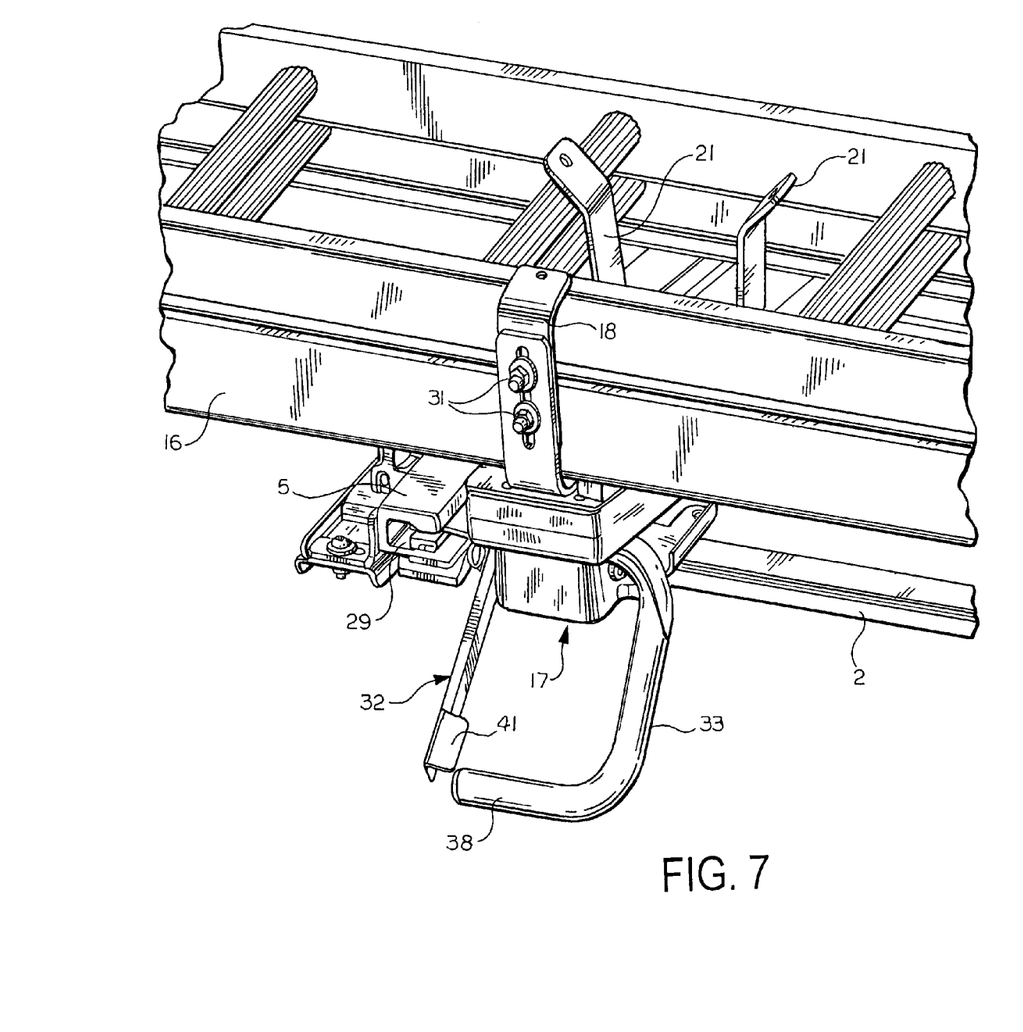
FIG. 7 is perspective side view of the rear guide assembly according to one embodiment of the present invention showing the latch release lever and ladder rack handle.

FIG. 7 is perspective side view of the rear guide assembly according to one embodiment of the present invention showing the latch release lever and ladder rack handle. The handle 33 is configured to have a portion 38 that is relatively perpendicular to the central axis of the carriage 24 of the guide bar assembly 12 so that an operator can easily apply a pulling and pushing force sliding the guide bar 15 with respect to the fixed hinge assembly 4 and hinged guide assembly 5. In addition the portion 38 of the handle 33 which is relatively perpendicular to the central axis of the carriage 24 of the guide bar assembly 12 can be used to apply a pushing or lifting force when pivoting the bed platform 3 and hinged guide assembly 5 from the loading/unloading position upward to align the hinged guide assembly 12 with the fixed guide assembly 4.

It is also noted that the handle 33 extends slightly downward over the side of a vehicle so that the end portion is not too high to reach by most people who might operate the ladder rack 1. It is to be understood that the exact configuration of the handle is not limited to the exemplified embodiment as long as the function of the handle is provided by any alternative or equivalent structure.

The main latch lever 32 is coupled to a main latch assembly 17 which, as discussed below, is housed beneath the outboard end of the guide bar assembly 12. The elements and function of the main latch assembly 17 are discussed below in reference to FIG. 8. It is sufficient here to point out that activating main latch lever 32 causes main latch assembly 17 to release the guide bar assembly 12 so that it can slide with respect to the fixed (and hinged) guide assembly 4. Otherwise, the main latch assembly 17 latches the guide bar assembly 12 in the stowage position depicted in FIG. 2.

The main latch lever 32 depicted in FIG. 7 is configured to have a free end 41 that can be depressed by an operator's thumb when the operator's hand grips handle 33. It is of course possible and within the scope of the present invention to configure and/or position the main latch lever 32 differently that exemplified in FIG. 7 as long as the latching function is provided, whether single or two-handed operation is required to operate the ladder rack 1.

Figure 8:
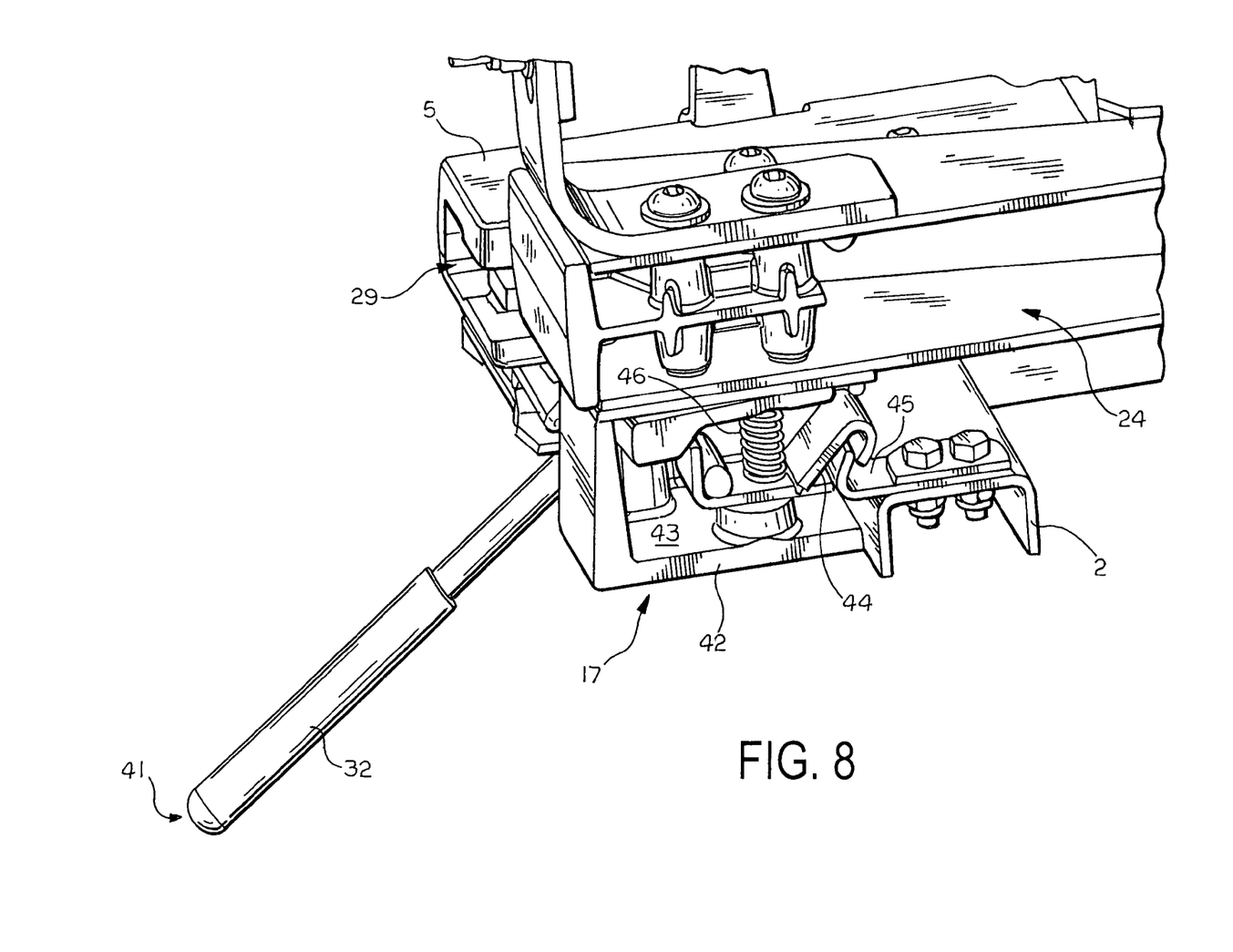
FIG. 8 is a cross sectional view of the main latch assembly according to one embodiment of the present invention.

FIG. 8 is a cross sectional view of the main latch assembly according to one embodiment of the present invention. The main latch assembly is located in housing 42 which is mounted to the bottom of carriage 24 provides a bottom base 43 that supports a pivotal catch 44 which is configured to engage a portion of the frame assembly 2, such as latch engagement bracket 45 or similar element or structure.

The pivotal catch 44 is forced downward by spring element 46 so as to normally engage latch engagement bracket 45. Pivotal catch 44 is pivoted upward from the position depicted in FIG. 8 to release latch engagement bracket 45 by pulling downward on main latch release lever 32, a portion of which is shown as being coupled to pivotal catch 44. Once the pivotal catch 44 is released from engagement with latch engagement bracket 45, an operator can move the ladder rack 1 by pulling on handle 33.

Figure 9:
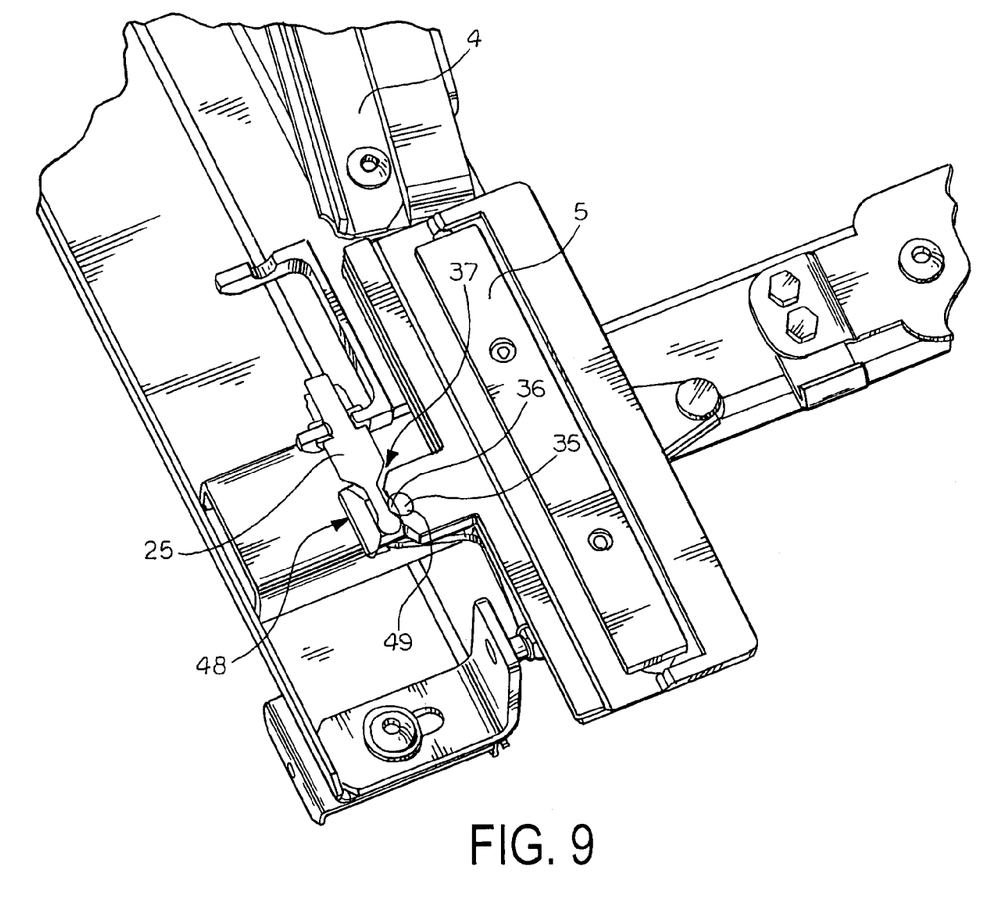
FIG. 9 is a cross sectional view of the latch stop assembly according to one embodiment of the present invention.

FIG. 9 is a cross sectional view of the latch stop assembly according to one embodiment of the present invention. The latch stop assembly 27 includes housing or block 48 that includes through-bore 37 into which pin latch 25 is received as indicated. Housing or block 48 further includes a thorough-bore 49 in which latch pin actuator 35 moves as discussed above. FIG. 9 depicts the configuration of pin latch 25 and how the larger end is caught by the latch pin actuator 35 except when the notch portion 36 is aligned with through-bore 37.

Figure 10:
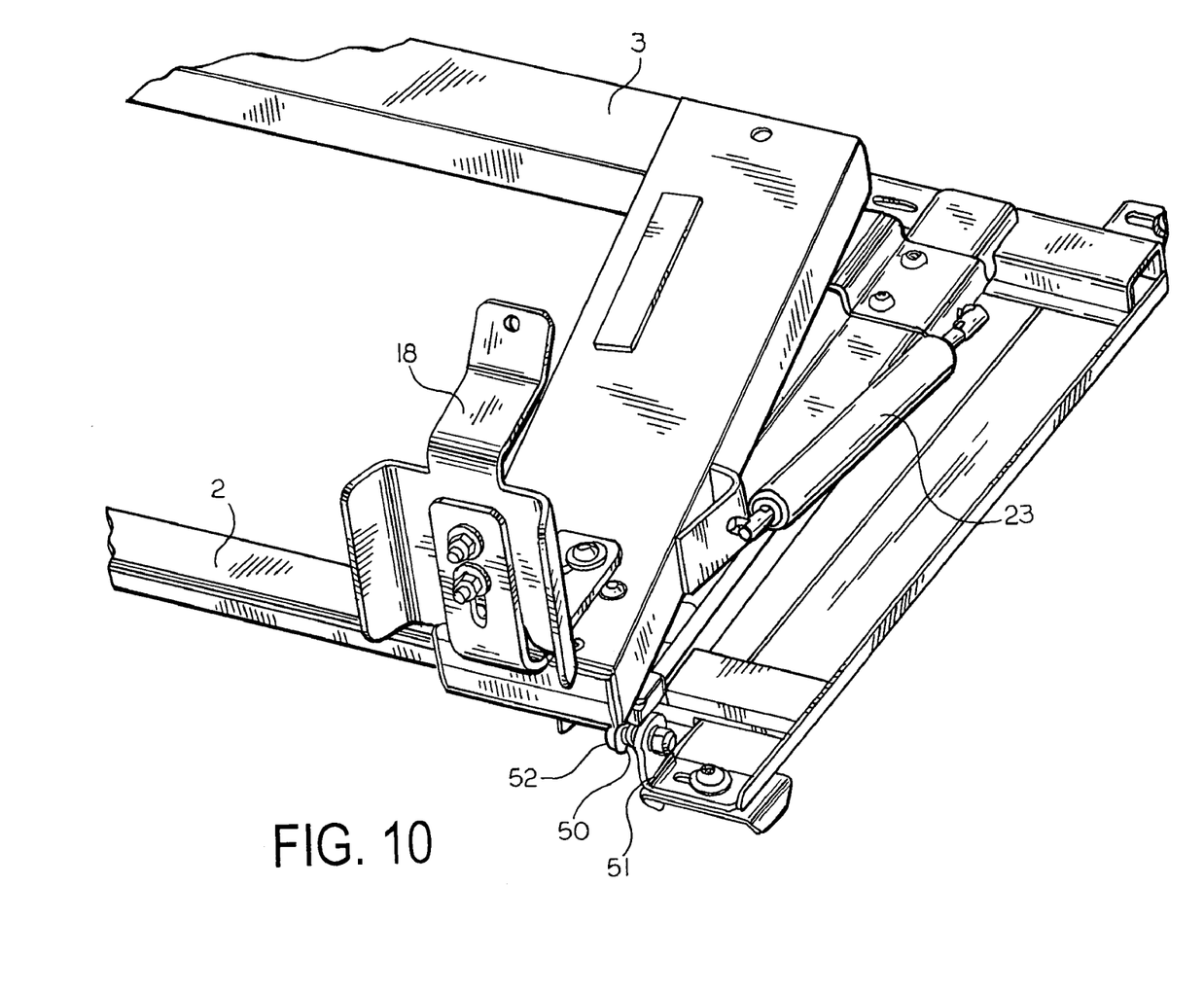
FIG. 10 is a perspective view of the pivotal connection between the frame assembly and bed platform according to one embodiment of the present invention.

FIG. 10 is a perspective view of the pivotal connection between the frame assembly and bed platform according to one embodiment of the present invention. The pivotal connection comprises a pivot bearing 50 that provides pivot point 6 about which the outboard corner of the bed assembly 3 opposed to the guide bar assembly end is coupled and can pivot. The pivot bearing is coupled between the bed assembly 3 and frame assembly 2 using suitable brackets 51, 52 that are positioned to provide any necessary clearance for operative movement of the bed platform 3.

Each of the examples of the ladder rack discussed above provide the guide bar assembly at rear position of the ladder rack 1 so that when the ladder rack 1 is in a loading (unloading) position an end, e.g. the front end or top of a ladder is positioned on a front portion of the bed assembly 3 to be engaged with a forward, outboard ladder grip 18. Next, the rear end or bottom of the ladder is lifted up and position on the bed assembly 3 to be engaged with a rearward, outboard ladder grip 18 and with the pair of rung grips 21 which are provided on the carriage 24 of the guide bar assembly 12.

Once the ladder is positioned on the bed platform 3, the operator lifts the guide bar assembly 12 using handle 33 and pivots hinged guide assembly 5 until the hinged guide assembly 5 and the fixed guide assembly 4 are aligned and latch actuator pin 35 is depressed upward. When pin latch 25 is released from the latch stop assembly 27, the operator slides guide bar 15 through slot 28 in the fixed guide assembly until the main latch assembly 17 engages and secures the ladder rack 1 in the stowage position.

To unload a stowed ladder from the latter rack, the process is reversed, with the operator first activating latch release lever 32 before sliding guide bar 15 through slot 28 in the fixed guide assembly 4 and into slot 29 in hinged guide bar assembly 5 until pin latch 25 is engaged by latch actuator pin 35 in latch stop assembly 27. Once pin latch 25 is engaged by latch actuator pin 35 in latch stop assembly 37, the guide bar assembly 12 is pivoted downward together with hinged guide assembly 5 until the bed platform 3 is in the unloading (loading) position.

Ladders can be loaded in the ladder rack in either direction. Moreover, the ladder rack could be mounted on a vehicle in a manner that is opposite to that depicted in the drawings, i.e. with the pivot point 6 at the rear portion of the vehicle. It is also possible to mount two ladders racks according to the present invention on opposite sides of a vehicle roof if desired.

The various elements of the present invention are preferably made of a relatively strong and resilient material such as steel, aluminum, iron, or other metal, plastic, fiberglass, composites, or combinations thereof. However, the materials of the rung grips and ladder grips and the bearing elements can be made of materials as described above.

Although the present invention has been described with reference to particular means, materials and embodiments, from the foregoing description, one skilled in the art can easily ascertain the essential characteristics of the present invention and various changes and modifications can be made to adapt the various uses and characteristics without departing from the spirit and scope of the present invention as described above.

What is claimed is:

1. A ladder rack for supporting a ladder in a stowage position and moving the ladder between the stowage position and a loading/unloading position at which the ladder can be loaded onto the rack or unloaded from the rack, said ladder rack comprising:
   a frame assembly which is mounted on a support structure;
   a bed platform having a first end that is pivotally coupled to the frame assembly by a pivot point that allows for multiple axis pivotal movement and a second end that is coupled to the frame assembly for alternative sliding and hinged movement with respect to the frame assembly, and
   a manually operative sliding mechanism and a manually operative pivoting mechanism for moving the bed platform between the stowage position and the loading/unloading position without overturning a ladder held on the bed platform.

2. A ladder rack according to claim 1, wherein the manually operative sliding mechanism comprises a guide bar assembly that cooperates with a fixed guide assembly that is coupled to the frame assembly.

3. A ladder rack according to claim 1, wherein the manually operative pivoting mechanism comprises a guide bar assembly that cooperates with a hinged guide assembly that is coupled to the frame assembly.

4. A ladder rack according to claim 1, wherein the manually operative sliding mechanism comprises a guide bar assembly that cooperates with a fixed guide assembly that is coupled to the frame assembly and the manually operative pivoting mechanism comprises the guide bar assembly, said guide bar assembly cooperates with a hinged guide assembly that is coupled to the frame assembly.

5. A ladder rack according to claim 4, wherein the manually operative sliding mechanism and the manually operative pivoting mechanism further comprises a latch mechanism that couples the guide bar assembly to the hinged guide assembly as the guide bar assembly is manually slid out of engagement with the fixed guide assembly.

6. A ladder rack according to claim 5, wherein the latch mechanism is released when the hinged guide mechanism is moved from the loading/unloading position to an intermediate position in which the fixed guide assembly and the hinged guide assembly are aligned with one another.

7. A ladder rack according to claim 1, further comprising a pair of spaced apart outboard ladder grips provided on the bed platform and an inboard ladder grip provided on the frame assembly and located midway between the pair of spaced apart outboard ladder grips.

8. A ladder rack according to claim 7, further comprising at least one ladder rung grip provided on the bed platform.

9. A ladder rack according to claim 1, wherein the support structure comprises a vehicle.

10. A ladder rack according to claim 9, wherein the support structure comprises the roof of a vehicle.

11. A ladder rack according to claim 1, further comprising a main latch assembly that secures the bed platform in the stowage position.

12. A ladder rack according to claim 1, wherein the manually operative sliding mechanism and the manually operative pivoting mechanism comprise a handle.

13. A ladder rack according to claim 1, wherein the frame assembly has a length which is substantially equal to a length of the bed assembly.

14. A ladder rack according to claim 1, further including one of a mechanical dampener and a hydraulic dampener for assisting with the manual operation of the pivoting mechanism.

15. A ladder rack for supporting a ladder in a stowage position and moving the ladder between the stowage position and a loading/unloading position at which the ladder can be loaded onto the rack or unloaded from the rack, said ladder rack comprising:

a frame assembly which is mounted on a support structure, said frame assembly having first and second ends;

a bed platform having flint and second ends;

a pivot bearing coupling the first end of the bed platform to the first end of the frame assembly which allows for multiple axis pivotal movement;

a guide bar assembly coupling the second end of the bed platform to the second end of the frame assembly, said guide bar assembly including a guide bar that projects outward from the second end of the bed platform;

a fixed guide bar assembly fixed to the second end of the frame assembly, said fixed guide assembly having an elongated slot for receiving said guide bar therein; and a hinged guide assembly pivotally coupled to the second end of the frame assembly, said hinged guide assembly having an elongated slot for receiving said guide bar therein, the guide bar being in both of the elongated slots of the fixed guide assembly and the hinged guide assembly when the ladder rack is in the stowage position, and the guide bar being exclusively in the elongated slot of the hinged guide assembly when the ladder rack is in the loading/unloading position.

16. A ladder rack according to claim 15, wherein the guide bar assembly includes a handle for manually moving the ladder rack between the stowage position and the loading/imloading position.

17. A ladder rack according to claim 15, wherein the guide bar assembly includes a latching mechanism that couples the guide bar assembly to the hinged guide assembly as the guide bar assembly is slid out of engagement with the fixed guide assembly.

18. A ladder rack according to claim 17, wherein the latch mechanism is released when the hinged guide mechanism is moved from the loading/unloading position to an intermediate position in which the fixed guide assembly and the hinged guide assembly are aligned with one another.

19. A ladder rack according to claim 15, further comprising a pair of spaced apart outboard ladder grips provided on the bed platform and an inboard ladder grip provided on the frame assembly and located midway between the pair of spaced apart outboard ladder grips.

20. A ladder rack according to claim 19, further comprising at least one ladder rung grip provided on the bed platform.

21. A ladder rack according to claim 15, wherein the support structure comprises a vehicle.

22. A ladder rack according to claim 21, wherein the support structure comprises the roof of a vehicle.

23. A ladder rack according to claim 15, further comprising a main latch assembly that secures the bed platform in the stowage position.

24. A ladder rack according to claim 15, wherein the frame assembly has a length which is substantially equal to a length of the bed assembly.

25. A ladder rack according to claim 15, further including one of a mechanical dampener and a hydraulic dampener for assisting with the manual operation of the pivoting mechanism.

* * * * *

UNITED STATES PATENT AND TRADEMARK OFFICE
CERTIFICATE OF CORRECTION

| | |
|---|---|
| PATENT NO. | : 7,097,409 B2 |
| APPLICATION NO. | : 10/685772 |
| DATED | : August 29, 2006 |
| INVENTOR(S) | : Thomas Scott Richter |

It is certified that error appears in the above-identified patent and that said Letters Patent is hereby corrected as shown below:

Column 11,
Line 3, should be changed from
   "a bed platform having flint and second ends;"
to
   --a bed platform having first and second ends;--

Signed and Sealed this

Fifth Day of December, 2006

JON W. DUDAS
*Director of the United States Patent and Trademark Office*